United States Patent
Bhattacharjee et al.

(10) Patent No.: US 11,652,638 B2
(45) Date of Patent: May 16, 2023

(54) SYSTEMS AND METHODS FOR MANAGING USER IDENTITIES IN NETWORKS

(71) Applicant: MASTERCARD INTERNATIONAL INCORPORATED, Purchase, NY (US)

(72) Inventors: Manash Bhattacharjee, Jersey City, NJ (US); Ashfaq Kamal, Stamford, CT (US); Rahul Deshpande, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 501 days.

(21) Appl. No.: 16/507,776

(22) Filed: Jul. 10, 2019

(65) Prior Publication Data
US 2021/0014062 A1 Jan. 14, 2021

(51) Int. Cl.
*H04L 9/32* (2006.01)
*H04L 9/40* (2022.01)
*H04L 9/30* (2006.01)
*G06F 9/54* (2006.01)

(52) U.S. Cl.
CPC .............. *H04L 9/3231* (2013.01); *G06F 9/54* (2013.01); *H04L 9/3073* (2013.01); *H04L 63/0861* (2013.01)

(58) Field of Classification Search
CPC . H04L 9/3231; H04L 9/3073; H04L 63/0861; H04L 2463/102; H04L 63/126; H04L 9/0894; G06F 9/54; H04W 12/06; H04W 12/108
See application file for complete search history.

(56) References Cited

U.S. PATENT DOCUMENTS

| 8,862,097 B2 * | 10/2014 | Brand | G06Q 20/42 455/411 |
| 9,742,763 B2 * | 8/2017 | Neuman | H04L 9/3234 |
| 10,725,768 B1 * | 7/2020 | Nguyen | H04L 67/34 |
| 10,791,461 B1 * | 9/2020 | Gailloux | H04W 12/73 |

(Continued)

FOREIGN PATENT DOCUMENTS

WO WO-2013112642 A2 * 8/2013 ............ H04M 15/72

*Primary Examiner* — Kristine L Kincaid
*Assistant Examiner* — Lydia L Noel
(74) *Attorney, Agent, or Firm* — Harness, Dickey & Pierce, P.L.C.

(57) ABSTRACT

Systems and methods are provided for managing user identities in networks. One exemplary method includes receiving, at a communication device, an API call request for a credential from a relying party. The communication device includes an application that incorporates an SDK. After receiving the API call request for the credential, the communication device authenticates a user associated with the communication device and identified in the API call request. After authentication of the user the communication device generates, via the SDK, a private-public key pair and stores the private key in memory. The communication device compiles, via the SDK, a credential packet include the public key and identity data associated with the user and transmits the credential packet to the relying party, whereby the relying party is registered to the SDK to request assertions of an identity of the user.

14 Claims, 4 Drawing Sheets

(56) References Cited

U.S. PATENT DOCUMENTS

| | | | |
|---|---|---|---|
| 2015/0088750 A1* | 3/2015 | Dua | G06Q 20/20 |
| | | | 705/44 |
| 2015/0220932 A1* | 8/2015 | Mardikar | G06Q 20/20 |
| | | | 705/41 |
| 2017/0102925 A1* | 4/2017 | Ali | G06F 8/30 |
| 2018/0007059 A1* | 1/2018 | Innes | G06F 21/6218 |
| 2019/0043022 A1* | 2/2019 | Fosmark | G06Q 20/02 |
| 2019/0354958 A1* | 11/2019 | Watkins | H04L 9/30 |
| 2020/0067907 A1* | 2/2020 | Avetisov | H04L 9/0825 |

* cited by examiner

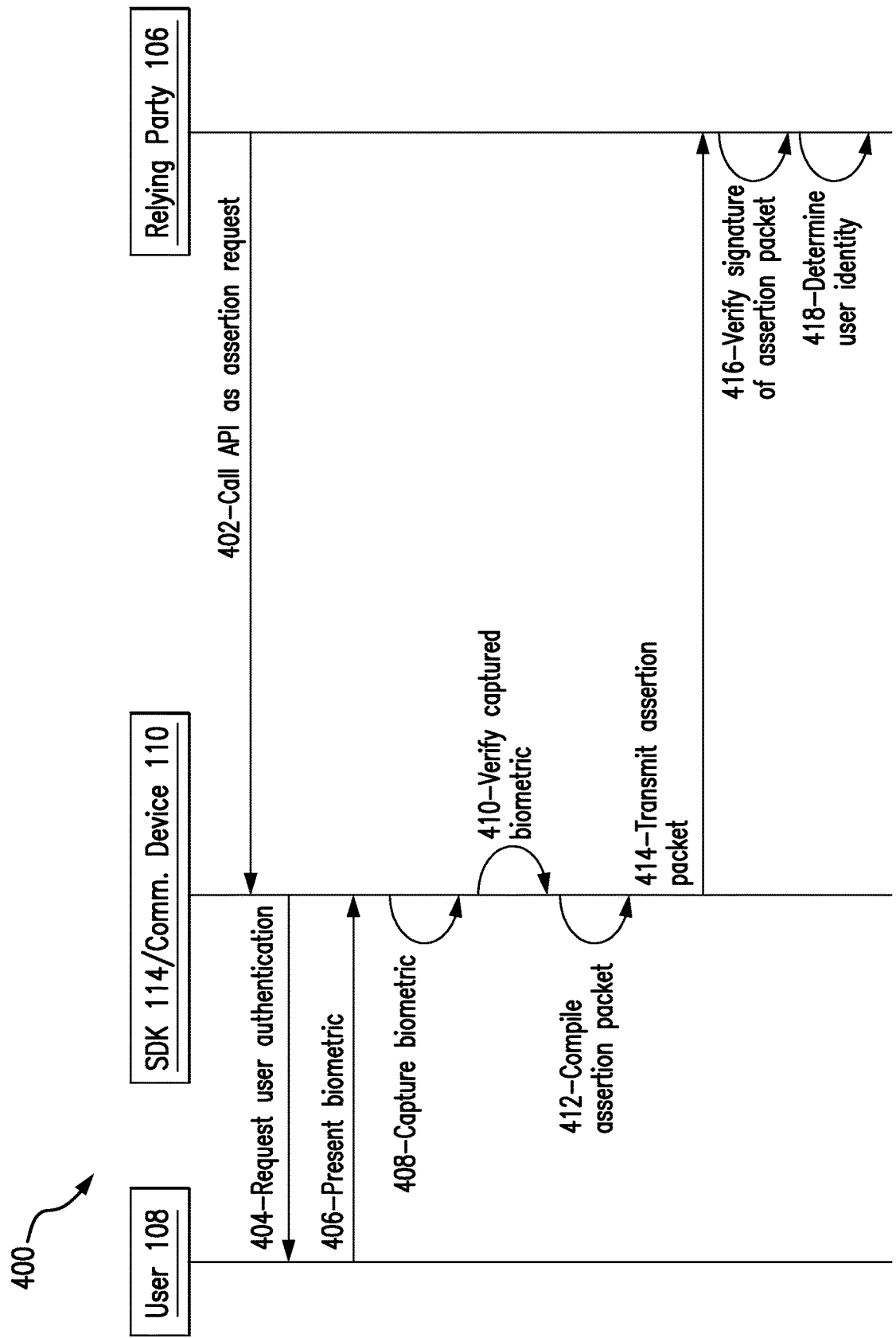

SYSTEMS AND METHODS FOR MANAGING USER IDENTITIES IN NETWORKS

FIELD

The present disclosure is generally directed to systems and methods for use in managing user identities in networks, and in particular, to systems and methods for use in incorporating user identities into network-based applications, whereby the network-based applications permit verification of the users.

BACKGROUND

This section provides background information related to the present disclosure which is not necessarily prior art.

Users are known to be associated with identities. Such identities may include names of the users, mailing addresses of the users, ages of the users, genders of the users, government numbers associated with the users, etc. The identities are often used by relying parties, in connection with one or more interactions with the users (e.g., opening an account, permitting access (e.g., to board a plane, etc.), etc.), to confirm that the users are who they claim to be. In so doing, the identities of the users may be verified, for example, by the relying parties through one or more physical documents such as driver's licenses, government issued cards or documents (e.g., birth certificates, etc.), utility bills, etc., prior to the relying parties engaging in the interactions with the users. In addition, some identities are known to be digital, whereby the identities are provided electronically to the relying parties, by devices associated with the users or through network activities involving the users, to establish the identities of users. In this manner, in response to a relying party's request to prove a user's identity, the user has the option to present a physical document(s), or, alternatively, to present his or her digital identity, to permit the relying party to verify the identity of the user. Once verified, the user is permitted to engage in whatever interactions are intended, with the relying party being confident in the identity of the user.

DRAWINGS

The drawings described herein are for illustrative purposes only of selected embodiments and not all possible implementations, and are not intended to limit the scope of the present disclosure.

Figure 1:
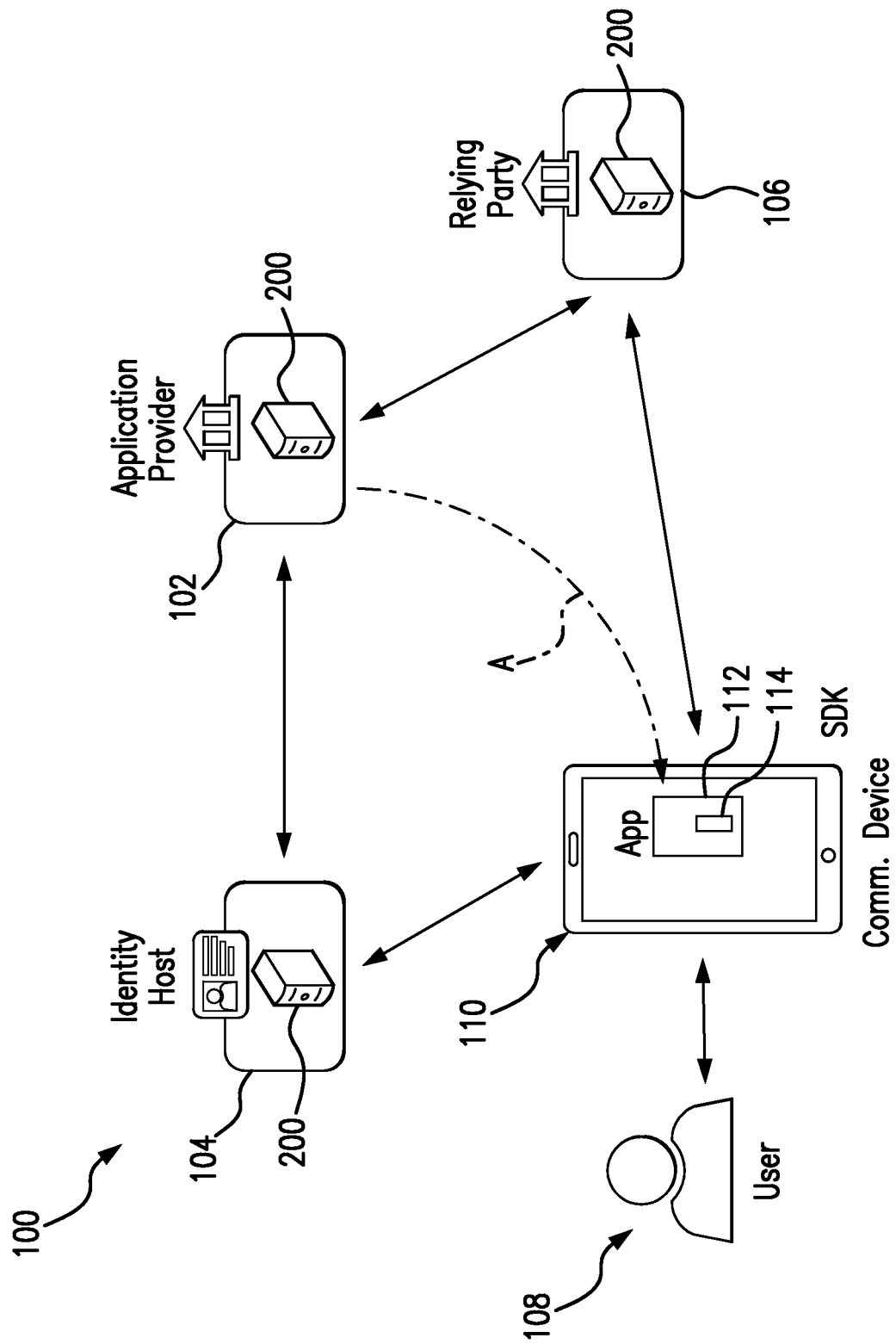
FIG. 1 is an exemplary system of the present disclosure suitable for use in managing digital identities of users through a network-based application installed at communication devices associated with the users.
Figure 3:
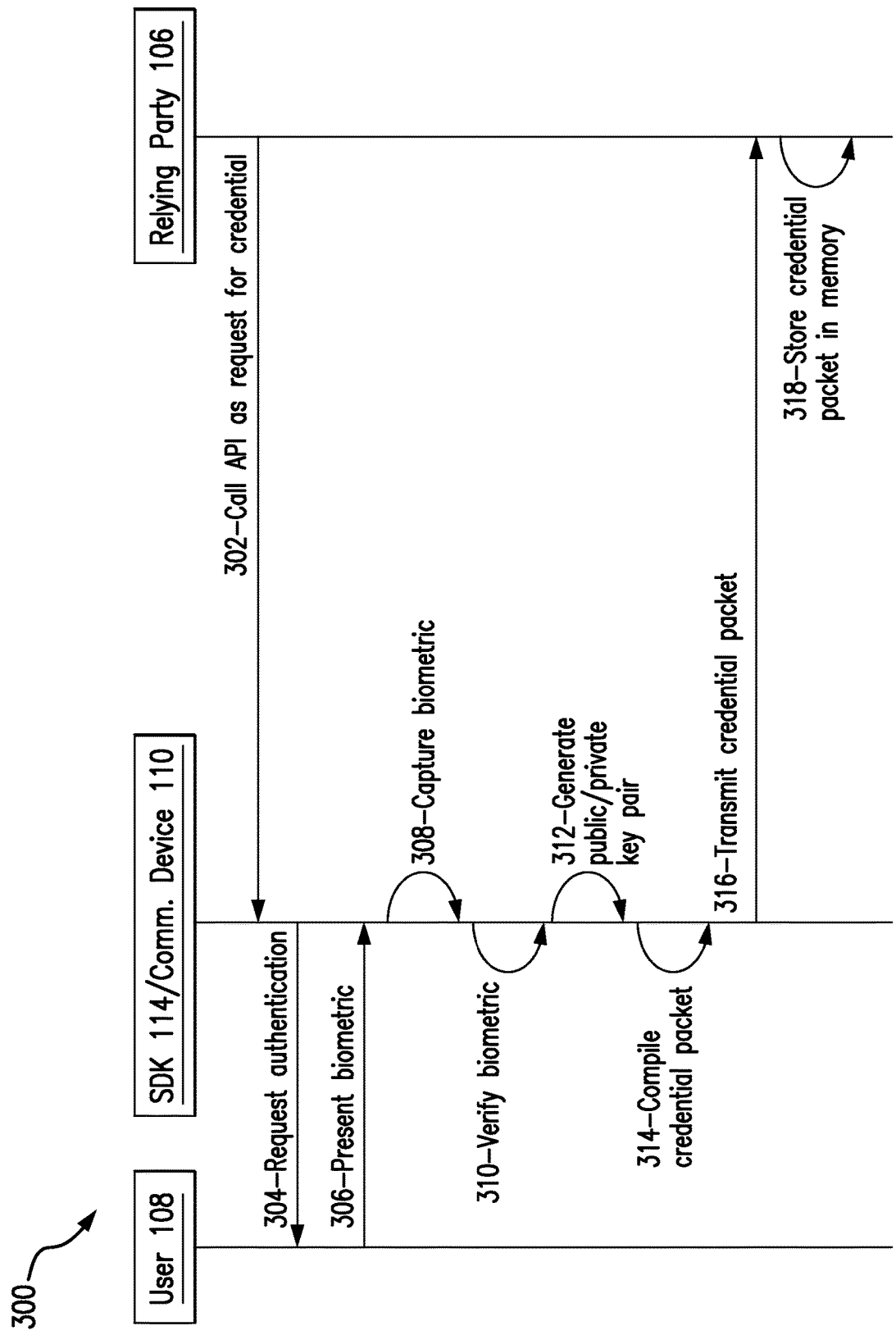

FIG. 3 is a flow diagram for an exemplary method, which may be implemented in connection with the system of FIG. 1, for registering (and verifying) a user identity for a user to a software development kit (SDK) identity provider incorporated into a network-based application associated with the user; and FIG. 4 includes a flow diagram for an exemplary method, which may be implemented in connection with the system of FIG. 1, for responding to a request to verify an identity assertion by a user through the SDK identity provider to which the user is registered.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users are associated with identities and, in connection with one or more interactions by the uses with relying parties, the relying parties often verify the identities of the users prior to initiating and/or completing the interactions. The relying parties may verify the identities of the users (e.g., may be required to do so, may desire to do so, etc.) for interactions limited to certain users (e.g., users requesting access to bank accounts, etc.), or when the relying parties intend to rely on the identities of the users to perform the interactions (e.g., opening new accounts for services, etc.). In addition, the users may be associated with communication devices, which include one or more network-based application (e.g., related to banking, retail purchases, social networks, etc.). While the application(s) include(s) a primary purpose (e.g., facilitating financial transactions, purchasing products, social interactions, etc.), the application(s) often contain(s) information about the users, and can be transformed into digital identity providers.

Uniquely, the systems and methods herein provide and utilize an application with a particular digital identity software development kit (SDK) included therein, whereby the application is converted (or transformed) to a digital identity provider for a user by way of the digital identity SDK. In particular, the application incorporates the digital identity SDK, whereby application programming interface (API) call requests for credentials and assertions associated with the user are directed to the digital identity SDK. For example, in response to a request for a credential by a relying party, the digital identity SDK initially authenticates the user, generates a key pair, and transmits a credential packet (including a public key of the key pair and identity data for the user) to the relying party that submitted the request. In this manner, the relying party is registered to the digital identity SDK to electronically request assertions of the user's identity. Then, once registered, the relying party submits another API call request to the digital identity SDK for an assertion relating to the identity of the user (e.g., when subsequently interacting with the user, etc.), whereupon the digital identity SDK again authenticates the user and transmits an assertion packet (including the identity data signed by a private key of the key pair) to the relying party. The relying party, in turn, is permitted to verify the packet based on the previously received public key and thereby verify the identity of the user. As such, the application (or other applications) associated with the user (e.g., installed at the user's communication device, etc.), which may be primarily directed to other functionalities (e.g., mobile banking, etc.), may be adapted by the digital identity SDK to be a digital identity provider for the user. This may provide an efficient enhancement of the application with little or minimal impact on the application itself (and the primary functionalities associated therewith) other than incorporation of the digital identity SDK, thereby providing proliferating the digital identity provider consistent with the wide dissemination of applications disseminated by application providers (and, thus, providing a practical implementation of the SDK).

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, relationships/interactions between users, relying parties, and identification providers; particular types of devices associated with the users; privacy requirements; etc.

The illustrated system 100 generally includes an application provider 102, an identity host 104, a relying party 106, and a user 108 associated with a communication device 110, each of which is coupled to (and is in communication with) one or more networks. The network(s) is/are indicated generally by arrowed lines in FIG. 1, and each may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In this exemplary embodiment, the application provider 102 includes a financial institution, such as a bank, a credit union, a brokerage firm, an insurance company, etc. In general, the financial institution is involved in monetary transactions, which may be on behalf of users having accounts issued and/or provided by the financial institutions. In the system 100, the application provider 102 (as the financial institution) has issued a payment account to the user 108. Further, the application provider 102 creates, develops and/or provides a network-based application 112 to such users (and/or others). When downloaded and installed at the communication device 110 associated with the user 108, as indicated by the dotted line A in FIG. 1, for example, the application 112 configures the communication device 110 to provide access to multiple functions associated with the user's account issued and/or provided by the financial institution, i.e., the application provider 102, such as, for example, ability to view balance and transaction histories for his/her account, transfer funds, impose account controls, report fraud, modify account settings, etc. In general, the application 112 is provided by the application provider 102 to, for example, make the interactions between the user 108 and the financial institution, i.e., the application provider 102, more efficient and/or convenient.

The identity host 104 includes an institution or entity, which provides a digital identity software development kit (SDK) 114 for inclusion in one or more applications. In this exemplary embodiment, the identity host 104 supplies the digital identity SDK 114 to the application provider 102, which, in turn, incorporates the digital identity SDK 114 into the application 112 as is shown in FIG. 1 (prior to the dissemination of the application 112 to the user 108 and installation in the communication device 110). In addition to providing the digital identity SDK 114, the identity host 104 may be configured to facilitate communications between one or more relying parties (e.g., the relying party 106, etc.) and the digital identity SDK 114 (e.g., for hosting APIs associated with or linked to the digital identity SDK 114, whereby the relying parties are able to communicate with the digital identity SDK 114; etc.). In this manner, in this exemplary embodiment, the identity host 104 is configured as a backend, as described in more detail below, for the digital identity SDK 114 and/or the application 112 with the digital identity SDK 114 incorporated therein. With that said, the identity host 104 may be a standalone part of the system 100, or it may be associated with and/or incorporated into one or more other parts of the system 100 (either shown in FIG. 1 or not), such as, for example, a payment network (e.g., the Mastercard® payment network, etc.) configured to facilitate payment account transactions by one or more users (e.g., the user 108, etc.) and one or more merchants, etc. (whereby the digital identity SDK 114 may be provided by the payment network as a service to customers or otherwise, etc.).

The relying party 106 may include any entity (e.g., person, business, company, etc.), which may attempt to identify the user 108 and/or rely on an identity of the user 108 for one or more purposes related to business or otherwise. In the exemplary system 100, the relying party 106 includes at least a virtual location (not shown), which may include, for example, a website accessible to users (e.g., the user 108) through one or more computing devices (e.g., the communication device 110). In addition, the relying party 106 may include a brick-and-mortar location.

Figure 2:
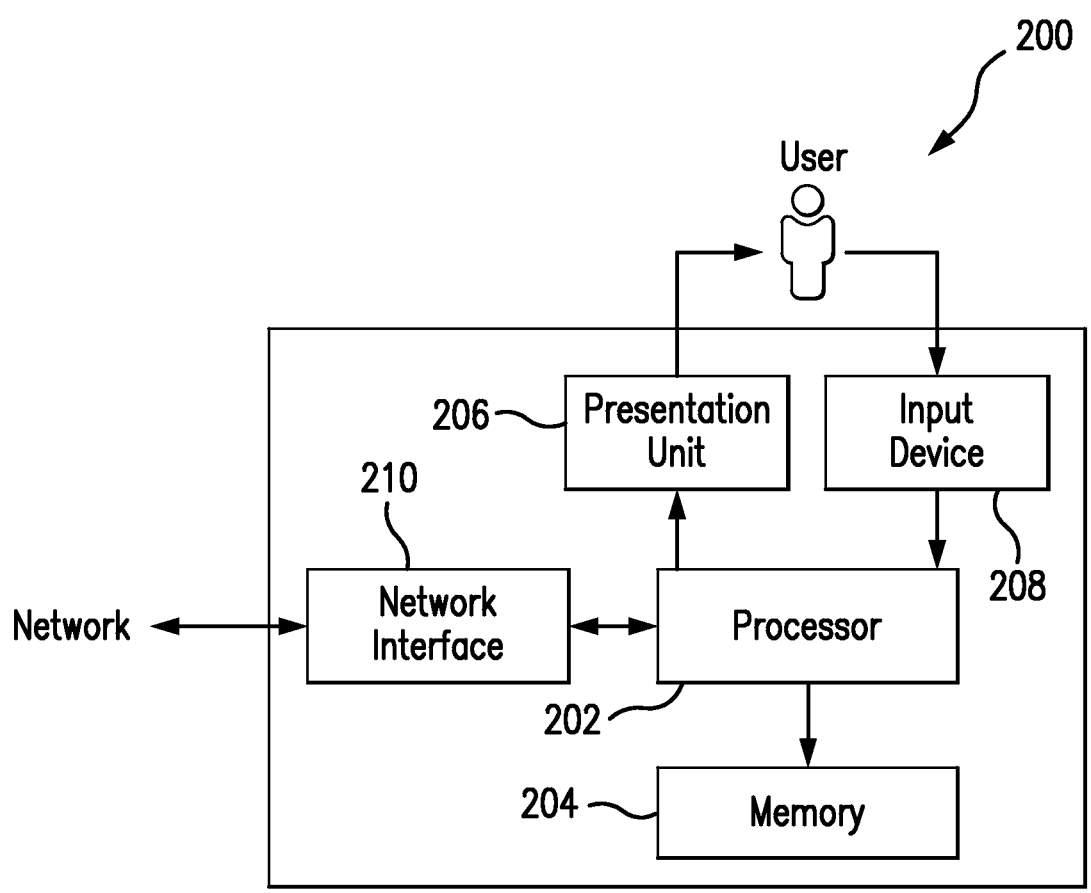
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the application provider 102, the identity host 104, and the relying party 106 is illustrated as including, or being implemented in, computing device 200, coupled to (and in communication with) one or more networks. In addition, the communication device 110 associated with the user 108 can be considered a computing device generally consistent with computing device 200 for purposes of the description herein. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity attributes, identity preferences, identity traits, key pairs, data packets, assertions, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein and help implement the practical (and transformative) nature thereof. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., prompts to verify the user's identity, etc.), visually or audibly, for example, to a user of the computing device 200 (e.g., user 108 associated with the communication device 110, etc.), etc. And various interfaces (e.g., as defined by the digital identity SDK 114, or as defined by one or more websites, etc.) (e.g., including instructions to scan a particular document, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, images of documents, etc., in response to prompts from the mobile application 112 and/or the digital identity SDK 114, as further described below. The input device 208 may include a single input device or multiple input devices. The input device 208 is coupled to (and is in communication with) the processor 202 and may include, for example, one or more of a keyboard, a pointing device, a mouse, a stylus, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different ones of the networks herein and/or with other devices described herein. In some exemplary embodiments, the computing device 200 may include the processor 202 and one or more network interfaces incorporated into or with the processor 202.

Referring again to FIG. 1, the application 112 (as installed at the user's communication device 110) includes the digital identity SDK 114, provided from the identity host 104, in connection with converting (or modifying or transforming) the application 112 to (or into) a digital identity enabled application. As such, upon such conversion, the application 112, in addition to its intended and/or core functions (e.g., relating to management of the user's account issued by the application provider 102, etc.), is then also permitted to participate in providing a digital identity for the user 108 to relying parties interacting with the user 108 (e.g., the relying party 106, etc.).

In connection with downloading and/or installing the application 112, various interactions may occur between the application provider 102, the identity host 104, and the digital identity SDK 114 in order to provision a digital identity to the communication device 110 for the user 108. Exemplary interactions may include capturing, storing, verifying, and/or confirming identifying information relating to the user 108 including, for example, identifying documents of the user 108, etc., whereby the identity of the user 108 is confirmed and/or verified in connection with the digital identity SDK 114 (and is then usable as a digital identity by the user 108 in connection with the relying party 106 as described below).

Once the application 112, with the digital identity SDK 114, is downloaded and installed in the communication device 110, as depicted in FIG. 1, the user 108 registers to the relying party 106 and/or other relying parties (e.g., in preparation for interacting with the relying party 106 and/or other relying parties, as part of ongoing interactions with the relying party 106 and/or the other relying parties, etc.). Specifically, for example, the user 108 accesses a virtual location (e.g., a website, etc.) of the relying party 106 and selects to be authenticated through the application 112 included in the communication device 110. In response, the relying party 106 is configured, in turn, to call an API associated with the application 112, and specifically, the digital identity SDK 114 incorporated into the application 112 (e.g., via the web browser at the communication device 110 (e.g., Chrome®, the Microsoft Edge® browser, etc.), etc.). In response to the API call, the communication device 110 is configured, by the digital identity SDK 114, to solicit authentication of the user 108, for example, through a biometric (e.g., a fingerprint, a voiceprint, a retina scan, a facial image, etc.). When the user 108 is authenticated (e.g., based on a biometric reference stored in the memory of the communication device 110 (e.g., the memory 204, etc.), etc.), the communication device 110 is configured, by the digital identity SDK 114, to generate a key pair for the relying party 106, which includes a public key and a private key (broadly, a key pair). The private key is stored in memory in the communication device 110, such as in a trusted execution environment (TEE) of the operating system of the communication device 110 (e.g., the Android® key store, etc.).

In addition, the communication device 110 is configured, by the digital identity SDK 114, to compile an identity packet for the relying party 106, which includes identity data for the user 108 (e.g., name, address, phone number, email address, etc.) and, in some examples, data for the user's communication device 110 (e.g., a device ID to thereby bind the identity data for the user 108 and/or the identity packet to the communication device 110, etc.). Further, the identity packet may include a validation or attestation indicator (or indication) as well as the public key of the key pair and a signature (e.g., a digital signature effected by the communication device 110 in signing the payload associated with the identity packet based on the private key, etc.) (as part of the validation or attestation indication verifying that the user 108 is who he/she says he/she is, etc.), etc. Then, the communication device 110 is configured, by the digital identity SDK 114, to transmit the identity packet to the relying party 106.

In response, the relying party 106 is configured to store the public key for authentication (e.g., FIDO Alliance® authentication, etc.), in association with the identity data for the user 108. In connection therewith, the relying party 106 may use the associated public key to verify (or validate or attest) that the received identity packet came from the intended source (i.e., from the communication device 110). In this manner, the relying party 106 is registered to the digital identity SDK 114, for example, to electronically request assertions of the user's identity.

Subsequently, when the user 108 returns to the relying party 106 (and in particular, the relying party's website), the relying party 106 is configured to offer authentication of the user's identity through the application 112 at the communication device 110. When selected by the user 108, the relying party 106 is configured to again call an API associated with the application 112, and in particular the digital identity SDK 114, via the web browser included in the communication device 110. In response, the communication device 110 is configured, by the digital identity SDK 114, to solicit authentication of the user 108, for example, through a biometric, and when the user 108 is authenticated, to compile an assertion packet, which includes an attestation and, potentially, in some embodiments the identity data again for the user 108 (e.g., for subsequent verification by the relying party 106, etc.) (although transmitting the identity data for the user 108 again as part of the assertion packet is not required in all embodiments). In connection therewith, the communication device 110 is configured, by the digital identity SDK 114, to sign the assertion packet with the private key in the communication device 110 (again as a digital signature) and to transmit the signed assertion packet to the relying party 106 in response to the API.

In turn, the relying party 106 is configured to verify the signature on the assertion packet, based on the public key previously received from the digital identity SDK 114 (and the communication device 110, via the identity packet), and to search for the corresponding identity packet for the user 108. This may be based on a user identifier (user ID) for the user 108 included in the assertion packet (e.g., a name of the user, another identifier associated with the user and included in the identity packet, etc.), or it may be based on the device ID for the communication device 110 included in the assertion packet (and from which the assertion packet is received). In any case, the relying party 106 is configured to identify the corresponding identity packet (and identity data included therein) for the user 108 (and thus, determine the identity of the user 108 and/or verify the particular identity characteristic claimed by the user 108, etc.).

In various embodiments, the digital identity SDK 114 may be configured to receive inputs from the user 108 (e.g., directly from the user 108; via habits of the user 108 in interacting with the communication device 110, the application 112, and/or the digital identity SDK 114; etc.) with regard to preferences for authentication when interacting with various different relying parties. In addition, the user 108 may be able to instruct the digital identity SDK 114 as to what identity attributes, traits, characteristics, etc. should be included in the identity packet transmitted to the relying party 106 (and to other relying parties) in connection with evidencing the identity of the user. For instance, the user 108 may direct the digital identity SDK 114 to include only certain data in the identity packet for one relying party (e.g., all available data except for a social security number, etc.), and to include other data in the identity packet for another relying party (depending on what particular data the given relying party may need to verify the identity of the user 108 for the given interaction between the user 108 and the relying party). In still other embodiments, the digital identity SDK 114 may be configured to analyze various attributes, actions, etc. of the user 108 in connection with utilizing the communication device 110, the application 112, and/or the digital identity SDK 114 to determine patterns and/or to determine if a current use thereof is consistent with the pattern(s) (e.g., as a further authentication basis to determine that the user 108 is attempting to interact with the digital identity SDK 114 and not someone else, etc.).

FIG. 3 illustrates an exemplary method 300 for use in registering an identity of a user to a digital identity SDK incorporated into a mobile application associated with the user (and to then register the user to a relying party to thereby enable the relying party to subsequently communicate with the digital identity SDK to verify the identity of the user). The exemplary method 300 is described as implemented in the digital identity SDK 114, the communication device 110, and the relying party 106 of the system 100, and to other parts thereof. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

Initially, the user 108 downloads and installs the application 112 to the communication device 110 (e.g., via communication with the application provider 102 or other platform through which the application 112 may be available, etc.). In so doing, the user 108 may populate the application 112 with certain data relating to the primary functionalities associated with the application 112 (e.g., the user's name, date of birth, residence address, account information, preferred payment devices, etc.). The digital identity SDK 114, then, may or may not utilize (or rely on) such data in generating the various packets for the user 108 herein (e.g., in some embodiments the digital identity SDK 114 may rely on the data provided to the application 112, in some embodiments the digital identity SDK 114 may not rely on and may not use any of the data provided to the application 112, etc.).

Thereafter in the method 300, the user 108 accesses a website associated with the relying party 106, to, for example, identify himself/herself to the relying party 106, so that the relying party 106 is to rely on the application 112 (and the digital identity SDK 114), in the communication device 110, to verify the identity of the user 108 in subsequent interactions. The website is accessed by a web browser at the communication device 110 (e.g., the Chrome® browser, the Microsoft Edge® browser, etc.), in this embodiment, but may be accessed through one or more other computing devices associated with the user 108. In response, the relying party 106, through the web browser (or otherwise), calls, at 302, an API associated with the application 112, and in particular, the digital identity SDK 114. The call is, specifically, a request for a credential associated with the user 108. The API call includes an identifier of the communication device 110 and/or the user 108 (e.g., a phone number, etc. as received from the user 108 and/or the communication device 110 when interacting with the website associated with the relying party 106, etc.), and also an identifier of the relying party 106 (e.g., a name, another identifier, etc.).

The API call, or broadly, the request, is received at the digital identity SDK 114 (in the communication device 110, as part of the application 112) (e.g., via a payment network such as Mastercard®, etc.), and the digital identity SDK 114, in turn, requests, at 304, authentication for the user 108, via the communication device 110. The request may include a request for biometric authentication through a fingerprint, voiceprint, facial image, retina scan, etc. At 306, then, the user 108 presents the biometric to the communication device 110 (e.g., to the input device 208, etc.). And, the biometric is captured, at 308 (e.g., by the input device 208, etc.). The communication device 110 verifies, at 310, the captured biometric against a reference biometric stored in the communication device 110 (e.g., as previously provided to the communication device 110 when setting up such authentication to the communication device 110, etc.). Thereafter, the digital identity SDK 114 generates, at 312, a key pair, which includes a private key and a public key. Initially, the digital identity SDK 114 stores the private key in a TEE in the communication device 110, such as, for example, the Android Keystore® within an Android® operating system in the communication device 110.

Next in the method 300, the digital identity SDK 114 compiles, at 314, a credential (or identity) packet for the user 108). The credential packet may include, for example, identity data associated with the user 108 (e.g., name, mailing address, phone number, etc.), a device ID for the communication device 110, and an attestation generally relating to the public key (as generated by the digital identity SDK 114) and a signature by the communication device 110 (based on the private key). The communication device 110 then transmits, at 316, the credential packet to the relying party 106 (in response to the API call). In connection therewith, it should be appreciated that the digital identity SDK 114 may have obtained at least some of the identity data for the user 108 through a registration and/or installation process associated with the application 112 (as generally described above in connection with the system 100) or from other applications (or data sources) at the communication device 110, whereby the identity data is potentially verified in connection with the registration and/or installation.

Upon receipt of the credential packet, the relying party 106 stores, at 318, the credential packet, in whole or in part, including the public key, in memory (e.g., the memory 204, etc.), in connection with at least a portion of the identity data. In connection therewith, the relying party 106 has generally verified the identity of the user 108 (when the data from the user 108 matches the data included in the credential packet), and registered for use of the digital identity SDK 114, thus permitting the relying party 106 to submit electronic assertion requests related to the user's identity via the digital identity SDK 114 in subsequent interactions. In this manner, the relying party 106 is registered to the digital identity SDK 114, for example, to electronically request assertions of the user's identity.

FIG. 4 illustrates an exemplary method 400 for use in responding to a request to verify an identity assertion by a user, through a digital identity SDK to which the user is associated (e.g., which includes a digital identity associated with the user, etc.). The exemplary method 400 is described as implemented in the digital identity SDK 114, the communication device 110, and the relying party 106 of the system 100, and other parts thereof. Reference is also made to the computing device 200. However, again, the methods herein should not be understood to be limited to the system 100 or the computing device 200, as the methods may be implemented in other systems and/or computing devices. Likewise, the systems and the computing devices herein should not be understood to be limited to the exemplary method 400.

At the outset in method 400, the user 108 accesses the website of the relying party 106, to, for example, apply for a service(s) offered by the relying party 106 (e.g., open an account for credit, open an account to provide utilities to the user 108, etc.), or otherwise interact with the relying party 106 whereby the identity of the user 108 is desired and/or necessary to apply for the service(s). In connection therewith, the user 108 selects to be authenticated by the relying party 106 (e.g., through the application 112, etc.). In response, at 402, the relying party 106, through the web browser (and via interaction with the digital identity SDK 114), calls, at 302, an API associated with the application 112, and in particular, the digital identity SDK 114. The call is, specifically, a request for an assertion of the user's identity. The API call includes an identifier of the communication device 110 (e.g., the device ID, a phone number, etc.) and/or an identifier associated with the user 108 (e.g., a user ID, etc.), and also an identifier of the relying party 106.

The API call, or broadly, the request for the assertion, is received at the digital identity SDK 114 (in the communication device 110, as part of the application 112), and the digital identity SDK 114, in turn, requests, at 404, authentication of the user 108, via the communication device 110 (e.g., in a similar manner to the requested authentication at 304 in method 300, etc.). The request for authentication may include a request for biometric authentication through a fingerprint, voiceprint, facial image, retina scan, etc. At 406, the user 108 presents the requested biometric to the communication device 110 (e.g., to the input device 208 thereof, etc.), wherein the biometric includes the requested fingerprint, retina scan, voiceprint, facial image, etc. The biometric is then captured, at 408 (e.g., by the input device 208 of the communication device 110, etc.).

Thereafter, the communication device 110 verifies, at 410, the captured biometric against a reference biometric stored in the communication device 110 (again, in a similar manner to the verification at 310 in the method 300). Thereafter, the digital identity SDK 114 compiles (or generates), at 412, an assertion packet as a response to the API call. The assertion packet includes an attestation (or validation) confirming that the user 108 has been authenticated and a signature of the communication device 110 by the private key stored in the TEE of the communication device 110. In addition, in some embodiments, the assertion packet may further include the identity data associated with the user 108 (e.g., name, mailing address, phone number, etc.) (i.e., which may be the same or different data from that included in the credential packet). The communication device 110 then transmits, at 414, the assertion packet to the relying party 106 (in response to the API call).

Upon receipt of the assertion packet, the relying party 106 verifies, at 416, the signature included therein (e.g., of the communication device 110, etc.) based on the previously received public key from the digital identity SDK 114 and/or the communication device 110, and associated, in memory, therewith. When the signature is verified, the relying party further determines the identity of the user 108, at 418, for example, from the identity data included in the assertion packet, or the identity data stored in memory from the credential packet based on data included in the assertion packet (e.g., a user ID, a device ID, etc.). And, the relying party 106 is then able to verify one or more assertions by the user 108 relating to his/her identity (based on the corresponding data in the credential packet).

In view of the above, the systems and methods herein provide management of user identities in networks. With the one or more digital identity SDKs described herein, the application providers are able to integrate and/or incorporate the digital identity SDKs in one or more applications, which include functionality specific to the application providers' relationship (e.g., business or otherwise, etc.) with users. The digital identity SDKs, as part of the applications, then perform as identity providers, which are embedded in the applications (e.g., a widely disseminated application, etc.), whereby the users are provided the benefit of the identity providers in the communication devices with limited or no impact to the application providers and/or the applications. In short, the digital identity SDKs herein serve to transform the applications into the identity providers, such that third parties, i.e., relying parties, are able to capture verification of the users' identities from the applications, when the applications are installed across multiple different communication devices and/or computing devices. In this manner, use of the digital identity SDKs depart from the routine and conventional verification of the users' identities, which in the above context are typically carried out via a two-component configuration, whereas under the present disclosure, a three-way component configuration is employed via new operations and configurations in connection with the digital identity SDKs incorporated into the applications separate from the web browsers described herein.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a communication device, an application programming interface (API) call request for a credential of a user from a relying party, the communication device including an application incorporating a software development kit (SDK), the user associated with the communication device and identified in the API call request; (b) after receiving the API call request for the credential, authenticating, by the communication device, the user (as associated with the communication device and identified in the API call request); (c) after authentication of the user, generating, by the communication device, via the SDK, a private-public key pair and storing, by the communication device, the private key in memory of the communication device; (d) compiling, by the communication device, via the SDK, a credential packet including the public key and identity data associated with the user; (e) transmitting the credential packet to the relying party, whereby the relying party is registered to the SDK to request assertions from the SDK of an identity of the user; (f) receiving, at the communication device, an API call request from the relying party for an assertion of the identity of the user; (g) after receiving the API call request for the assertion, authenticating, by the communication device, the user; (h) after authentication of the user, compiling, by the communication device, via the SDK, an assertion packet including another attestation from the SDK regarding authentication of the user, wherein assertion packet is signed with the private key stored in the memory of the communication device; and (i) transmitting the assertion packet to the relying party, whereby the assertion packet permits the relying party of verify the identity of the user.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" include any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in managing user identities, the method comprising:
   based on an interaction between a browser of a communication device and a website of a relying party, receiving, at a software development kit (SDK) in the communication device, an application programing interface (API) call request for a credential of a user from a computing device of the relying party, the communication device including an application of an application provider, the application incorporating the SDK, the user being associated with the communication device and identified in the API call request, the application being different from the browser, and the application provider being separate and different than the relying party;
   after receiving the API call request for the credential, authenticating, by the communication device, the user;
   after authentication of the user, generating, by the communication device, using the SDK, a private-public key pair and storing the private key in memory of the communication device;
   compiling, by the communication device, using the SDK, a credential packet including the public key and identity data associated with the user; and
   transmitting the credential packet to the relying party, whereby the relying party is registered to the SDK to request assertions from the SDK of an identity of the user.

2. The computer-implemented method of claim 1, wherein authenticating the user includes:
   soliciting, by the communication device, a biometric from the user; and
   verifying, by the communication device, a captured biometric for the user to a reference biometric associated with the user.

3. The computer-implemented method of claim 2, wherein the credential packet further includes an attestation of the identity of the user from the SDK; and
   wherein the credential packet is signed by the private key.

4. The computer-implemented method of claim 1, further comprising:
   after transmitting the credential packet:
      receiving, at the communication device, from the relying party, an API call request for an assertion of the identity of the user;
      after receiving the API call request for the assertion, authenticating, by the communication device, the user;
      after authentication of the user, compiling, by the communication device, using the SDK, an assertion packet including another attestation from the SDK regarding authentication of the user, wherein the assertion packet is signed with the private key stored in the memory of the communication device; and
      transmitting the assertion packet to the relying party, whereby the assertion packet permits the relying party to verify the identity of the user.

5. The computer-implemented method of claim 4, wherein the assertion packet further includes the identity data associated with the user.

6. The computer-implemented method of claim 1, wherein the identity data includes at least a name and an address associated with the user; and
   wherein the API call request for the credential includes a phone number associated with the communication device.

7. The computer-implemented method of claim 1, wherein the application provider is a banking institution;
   wherein the application includes a banking application; and
   wherein the user is associated with an account issued by the banking institution, whereby the application is usable to access information about the account.

8. A non-transitory computer-readable storage medium including executable instructions defining a software development kit (SDK) for managing a digital identity of a user, which when executed by at least one processor of a communication device associated with the user, cause the at least one processor to:
   based on an interaction between a browser of the communication device and a website of a relying party, receive an application programing interface (API) call request for a credential of the user from a relying party, the SDK being incorporated into an application of an application provider, the application being different than the browser, and the application provider being separate and different than the relying party;
   after receiving the API call request for the credential, authenticate the user;
   after authentication of the user, generate a private-public key pair and store the private key in memory of the communication device;
   compile a credential packet for the user including the public key and identity data associated with an identity of the user, and sign the credential packet with the private key; and
   transmit the credential packet to the relying party, whereby the relying party is registered to the SDK to request assertions from the SDK of the identity of the user.

9. The non-transitory computer-readable storage medium of claim 8, wherein the credential packet further includes an attestation from the SDK regarding authentication of the user in connection with the credential packet.

10. The non-transitory computer-readable storage medium of claim 9, wherein the identity data includes at least a name and an address associated with the user; and
   wherein the API call request for the credential includes a phone number associated with the communication device.

11. The non-transitory computer-readable storage medium of claim 8, wherein the executable instructions, when executed by the at least one processor, further cause the at least one processor to, after transmitting the credential packet:
   receive, via the application at the communication device, from the relying party, an API call request for an assertion of the identity of the user in connection with an interaction between the user and the relying party;

after receiving the API call request for the assertion, authenticate the user;

after authentication of the user, compile an assertion packet including another attestation regarding the identity of the user, wherein the assertion packet is signed with the private key stored in the memory of the communication device; and transmit the assertion packet to the relying party, whereby the relying party is able to verify the assertion packet with the public key and whereby the assertion packet permits the relying party to verify the identity of the user.

12. The non-transitory computer-readable storage medium of claim 11, wherein the application includes a banking application;

wherein the application provider includes a banking institution; and wherein the user is associated with an account issued by the banking institution, whereby the application is usable to access information about the account.

13. The non-transitory computer-readable storage medium of claim 12, wherein the executable instructions, when executed by the at least one processor, further cause the at least one processor to:

solicit a biometric from the user; and verify a captured biometric for the user to a reference biometric associated with the user.

14. The non-transitory computer-readable storage medium of claim 13, wherein the assertion packet further includes the identity data associated with the user.

* * * * *